United States Patent
Bendersky et al.

(10) Patent No.: US 8,213,598 B2
(45) Date of Patent: Jul. 3, 2012

(54) HARMONIC DISTORTION RESIDUAL ECHO SUPPRESSION

(75) Inventors: Diego Ariel Bendersky, Buenos Aires (AR); Jack W. Stokes, III, North Bend, WA (US); Henrique S. Malvar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1164 days.

(21) Appl. No.: 12/037,088

(22) Filed: Feb. 26, 2008

(65) Prior Publication Data

US 2009/0214048 A1 Aug. 27, 2009

(51) Int. Cl.
H04M 9/08 (2006.01)

(52) U.S. Cl. ......... 379/406.14; 379/406.05; 379/406.13; 381/66; 381/93

(58) Field of Classification Search ............. 379/406.05, 379/406.12, 406.13, 406.14; 381/66
See application file for complete search history.

(56) References Cited

U.S. PATENT DOCUMENTS

| | | | |
|---|---|---|---|
| 5,680,450 A | 10/1997 | Dent et al. | |
| 6,658,107 B1 | 12/2003 | Sorqvist et al. | |
| 6,904,146 B2 | 6/2005 | Domer et al. | |
| 7,155,018 B1 | 12/2006 | Stokes, III et al. | |
| 2003/0031315 A1 | 2/2003 | Belt et al. | |
| 2004/0001597 A1 | 1/2004 | Marton | |
| 2004/0018860 A1 | 1/2004 | Hoshuyama | |
| 2006/0222172 A1* | 10/2006 | Chhetri et al. | 379/406.05 |
| 2007/0263850 A1 | 11/2007 | Stokes et al. | |
| 2011/0013781 A1* | 1/2011 | Chhetri et al. | 381/66 |

OTHER PUBLICATIONS

Boll, S., Suppression of acoustic noise in speech using spectral subtraction, IEEE Transactions on Acoustics, Speech and Signal Processing, Apr. 1979, vol. 27, No. 2, pp. 113-120.
Chhetri, A., A. C. Surendran, J. W. Stokes, J. C. Platt, Regression-based residual acoustic echo suppression, Int'l Workshop on Acoustic Echo and Noise Control, Sep. 2005, Eindhoven, Netherlands.
Dai, H., W.-P. Zhu, Compensation of loudspeaker nonlinearity in acoustic echo cancellation using raised-cosine function, IEEE Transactions on Circuits and Systems II: Express Briefs, Nov. 2006, vol. 53, No. 11, pp. 1190-1194.
Ephraim, Y. Malah, D., Speech enhancement using a minimum mean-square error log-spectral amplitude estimator, IEEE Transactions on Acoustics, Speech and Signal Processing, Apr. 1985, vol. 33, No. 2, pp. 443-445.
Guérin, A., G. Faucon, R. Le Bouquin-Jeannès, Nonlinear acoustic echo cancellation based on Volterra filters, IEEE Transactions on Speech and Audio Processing, Nov. 2003, vol. 11, No. 6, pp. 672-683.

(Continued)

*Primary Examiner* — Matthew Landau
*Assistant Examiner* — Khaja Ahmad
(74) *Attorney, Agent, or Firm* — Lyon & Harr, LLP; Richard T. Lyon

(57) ABSTRACT

Harmonic distortion residual echo suppression (HDRES) technique embodiments are presented which act to suppress the residual echo remaining after a near-end microphone signal has undergone AEC, including harmonic distortion in the signal that was caused by the speaker audio signal playback. In general, an AEC module is employed which suppresses some parts of the speaker audio signal found in a near-end microphone signal and generates an AEC output signal. A HDRES module then inputs the AEC output signal and the speaker audio signal, and suppresses at least a portion of a residual part of the speaker audio signal that was left unsuppressed by the AEC module. This includes at least a portion of the harmonic distortion exhibited in the AEC output signal.

19 Claims, 10 Drawing Sheets

OTHER PUBLICATIONS

Gustafsson, S., R. Martin, P. Vary, Combined acoustic echo control and noise reduction for hands-free telephony, Signal Processing, Acoustic Echo and Noise Control, vol. 64, No. 1, Jan. 1998, pp. 21-32.

Hoshuyama, O., A. Sugiyama, An acoustic ECHO suppressor based on a frequency-domain model of highly nonlinear residual ECHO, IEEE Int'l Conf. on Acoustics, Speech and Signal Processing, May 2006.

Im, S., A normalized block LMS algorithm for frequency-domain Volterra filters, IEEE Signal Processing Workshop on Higher-Order Statistics, Jul. 21-Jul. 23, 1997, pp. 152-156.

Kuech, F., A. Mitnacht, W. Kellermann, Nonlinear acoustic echo cancellation using adaptive orthogonalized power filters, IEEE Int'l Conf. on Acoustics, Speech, and Signal Processing, Multimedia Commun. & Signal Process., Mar. 2005, vol. 3, pp. iii/105-iii/108.

Kuech, F., W. Kellermann, Nonlinear residual echo suppression using a power filter model of the acoustic echo path, IEEE Int'l Conf. on Acoustics, Speech and Signal Processing, Apr. 2007, pp. I-73-I-76, Honolulu, HI.

Malvar, H., A modulated complex lapped transform and its applications to audio processing, IEEE Int'l Conf. on Acoustics, Speech, and Signal Processing, Mar. 1999, vol. 3, pp. 1421-1424, Phoenix, AZ, USA.

Martin, R., Spectral subtraction based on minimum statistics, Proc. Eur. Signal Processing Conf., pp. 1182-1185, Sep. 1994.

Mitchell, O. M. M., D. A. Berkley, Reduction of long-time reverberation by center clipping, Program of the 78th Meeting of the Acoustical Society of America, Nov. 1970, vol. 47, No. 1, pp. 84.

Rabaa, A. B., R. Tourki, Acoustic echo cancellation based on a recurrent neural network and a fast affine projection algorithm, Proc. of the 24th Annual Conf. of the IEEE Industrial Electronics Society, Aug.-Sep. 1998, vol. 3, pp. 1754-1757.

* cited by examiner

HARMONIC DISTORTION RESIDUAL ECHO SUPPRESSION

BACKGROUND

Acoustic Echo Cancellers (AECs) are a critical component in every full-duplex, speech communication system. Its purpose is to remove the echo captured by a local microphone when an audio signal is played through a loudspeaker. The audio signal is often referred to as the speaker audio signal. Typically, an AEC is used during full-duplex communication between someone at a so-called near-end location speaking with another person located remotely at a so-called far-end location. When the far-end person speaks, their voice is transmitted to the near-end location and played through one or more loudspeakers positioned therein. The far-end person's speech, as well as near-end sounds (e.g., near-end speech and/or background noise) is then captured by a near-end location microphone. Without an AEC to process the resulting microphone signal, a copy of the far-end speech would be transmitted back to the far-end location and played on a loudspeaker(s) positioned there. Thus, the far-end person would hear a delayed echo of their previous speech. An AEC suppresses the component of the near-end microphone signal corresponding to the captured speaker audio signal, thereby reducing the perceived echo effect at the far-end location.

An AEC is also used in scenarios that involve audio being played through a near-end loudspeaker, but which is generated locally rather than coming from a far-end location. For example, an AEC can be used to cancel the component of a microphone signal corresponding to audio generated or stored on the computer and played through a local loudspeaker (e.g., music, game sounds, and so on).

While an AEC significantly reduces the echo component of the near-end microphone signal, there is often a residual portion leftover, which is often referred to as the residual echo. In many applications, this residual echo is unacceptable and must be further suppressed. One way of accomplishing this task is through the use of residual echo suppression (RES). RES takes the output of the AEC as input, and further suppresses the residual echo.

SUMMARY

Harmonic distortion residual echo suppression (HDRES) technique embodiments described herein act to suppress the residual echo remaining after a near-end microphone signal has undergone AEC. This includes the suppression of harmonic distortion components in the microphone signal resulting in feedback for the distortion components present in the speaker audio signal, due to nonlinearities in the audio amplifier, the loudspeaker itself, and the mechanical casing.

Generally, the HDRES technique embodiments described herein employ program modules executable by a computing device, which include an AEC module and a HDRES module. The AEC module suppresses some parts of the speaker audio signal found in the near-end microphone signal and generates an AEC output signal. The HDRES module inputs the AEC output signal and the speaker audio signal, and suppresses at least a portion of a residual part of the speaker audio signal that was left unsuppressed by the AEC module. This includes at least a portion of the harmonic distortion exhibited in the AEC output signal that was caused by the speaker audio signal playback.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description of harmonic distortion residual echo suppression (HDRES) technique embodiments, reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Harmonic Distortion Residual Echo Suppression

The HDRES technique embodiments described herein act to suppress the residual echo remaining after a near-end microphone signal has undergone Acoustic Echo Cancellation (AEC), and works particularly well where the signal includes harmonic distortion. Non-linear harmonic distortion is often introduced in the echo when laptop computers or telephony devices are employed as the near-end loudspeaker. Common sources of this distortion include low-quality loudspeakers, overpowered amplifiers and poorly-designed enclosures. For example, some laptop computers have lightweight, loose enclosures which in combination with high-power speaker signals produce vibrations and reverberances in the enclosure that generate harmonic distortion which is picked up by the near-end microphone (that may also be housed in the notebook computer case). In addition, the high loudspeaker volume levels often employed with hands-free telephony and videoconferencing can similarly produce non-linear harmonic distortion in the echo portion of the near-end microphone signal. This effect causes signal components with high power on particular frequencies in the speaker signal to produce an increase in the power of frequencies that are exact multiples of the fundamental band, thereby introducing the harmonic distortion in the near-end microphone signal. The HDRES technique embodiments described herein have the advantage of suppressing this harmonic distortion as well as the residual echo in the microphone signal.

1.1 The Echo Reduction Environment

Figure 1:
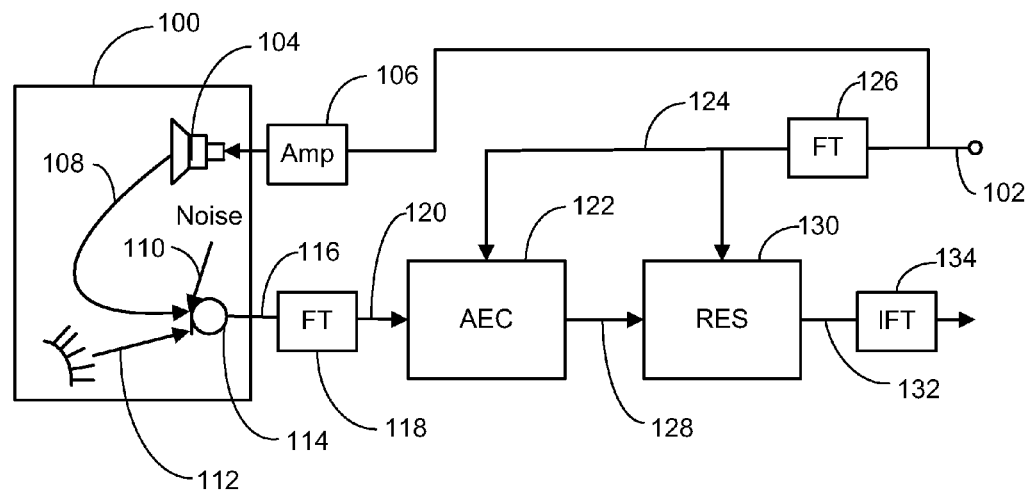
FIG. 1 is a block diagram depicting an overall echo reduction scheme including a residual echo suppression (RES) module that performs HDRES.

The role of the HDRES technique embodiments described herein in an overall echo reduction scheme is illustrated in FIG. 1. An input signal 102 (which may be coming from a remote location or locally generated) is received and played in a near-end space represented by block 100 via loudspeaker 104. Typically, this input signal 102 will be amplified by an amplifier 106 prior to being played by the loudspeaker 104. The speaker audio 108, as well as the ambient noise 110 in the near-end space and near-end signal 112 is picked up by the microphone 114 which produces a microphone signal 116.

The microphone signal 116 is first fed through a frequency transform (FT) module 118, which in one embodiment employs a modulated complex lapped transform (MCLT). MCLT is a particular form of a cosine modulated filter-bank that allows for perfect reconstruction and transforms the time domain microphone signal 116 into the frequency domain. MCLT also allows low-delay architectures when combined with encoders based on the modulated lapped transform, such as G.722.1. However, other frequency domain transforms can be used instead, if desired (e.g. Short-Time Fourier Transform (STFT) or Discrete Fourier Transform (DFT) Filter Banks).

The transformed microphone signal 120 is next fed into a linear, sub-band AEC module 122, along with a frequency transformed version of the input signal 124. The input signal 102 is transformed by passing it through a FT module 126 identical to module 118 (e.g., MCLT).

The AEC module 122 suppresses a portion of the transformed microphone signal 120 attributable to the aforementioned speaker audio 108. The signal 128 output from the AEC module 122 is in turn fed into a Residual Echo Suppressor (RES) module 130, which includes one or more sub-modules that implement HDRES technique embodiments, as will be described in the sections to follow. The RES module 130 uses the AEC output signal 128 and the aforementioned frequency transformed version of the input signal 124 (along with AEC adaptive filter coefficients and the number of taps as will be described later) to produce a RES output signal 132.

Optionally, the RES output signal 132 is then fed through an inverse frequency transform (IFT) module 134 (e.g., an inverse MCLT, inverse STFT, inverse DFT) to transform it to the time domain.

The aforementioned linear, sub-band AEC employs a frequency-domain linear adaptive technique to perform per-band time prediction, and an estimated echo $\hat{D}(K,m)$ is computed, which corresponds to the portion of the microphone signal attributable to the aforementioned speaker audio that is to be suppressed. This echo can be estimated as:

$$\hat{D}(\kappa, m) = \sum_{t=0}^{T-1} W_L(t, m) X(\kappa - t, m) \quad (1)$$

where $W_L$ is a complex weight matrix for the linear AEC, X is the complex frequency transform of the speaker signal, K is a signal segment index, m is the frequency band, and T is the number of taps considered. It is the estimated echo $\hat{D}(K,m)$ that is suppressed in the transformed microphone signal to produce the AEC output signal using conventional methods.

The aforementioned RES module includes one or more sub-modules that implement HDRES technique embodiments, as indicated previously. These embodiments will now be described.

1.2 Harmonic Distortion Residual Echo Suppression Technique Embodiments

HDRES can be modeled as a noise suppression problem. Consider the residual echo as noise. As such, an additive signal plus noise model can be used, where the near-end speech plus background noise is the signal and the residual echo is the noise. The input to HDRES is $E(\kappa,m)$, which is also the output of the linear AEC. This AEC output can be defined as:

$$E(\kappa,m) = D_r(\kappa,m) + S(\kappa,m) + N(\kappa,m) \quad (2)$$

where $D_r(\kappa,m)$ is the true, residual echo signal, $S(\kappa,m)$ the near-end signal and $N(\kappa,m)$ the background noise. Under this assumption, the residual echo per band is further suppressed using a magnitude regression model based on the residual fundamental band and the harmonic frequencies as:

$$R(\kappa,m) = G(\kappa,m) E(\kappa,m). \quad (3)$$

The real valued gain, $G(\kappa,m)$, is given by:

$$G(\kappa, m) = \frac{\max\{\overline{E}(\kappa, m) - \beta \overline{D}_r(\kappa, m), \overline{N}(\kappa, m)\}}{\overline{E}(\kappa, m)} \quad (4)$$

with smoothed magnitudes estimates of the AEC output, $\overline{E}(\kappa,m)$, residual echo, $\overline{D}_r(\kappa,m)$, and noise floor, $\overline{N}(\kappa,m)$, computed using recursive averages as:

$$\overline{E}(\kappa,m) = (1-\alpha)\overline{E}(\kappa-1,m) + \alpha |E(\kappa,m)| \quad (5)$$

$$\overline{D}_r(\kappa,m) = (1-\alpha)\overline{D}_r(\kappa-1,m) + \alpha |\overline{D}_r(\kappa,m)| \quad (6)$$

$$\overline{N}(\kappa,m) = (1-\alpha)\overline{N}(\kappa-1,m) + \alpha |\hat{N}(\kappa,m)| \quad (7)$$

In Eq. (7), $|\hat{N}(\kappa,m)|$ is the estimate of the magnitude of the noise floor for time segment $\kappa$ and sub-band m computed by minimum statistics or some other method (e.g. stationary noise estimator), $\beta$ can be used to tune the "aggressiveness" of the algorithm, $\alpha$ controls the amount of smoothing, and $R(\kappa, m)$ is the complex output of the HDRES. The range for $\alpha$ is 0 to 1 with a typical value being 0.5 The range for $\beta$ is 0 to 1 with a typical value being 0.95. It should be noted that multiplying by the real valued gain G(κ,m) affects only the magnitude of each sub-band, but not the phase. The magnitude regression model can be used since the residual phase information is difficult to predict and is non-critical for speech intelligibility. Given the microphone signal contains background noise, spectral subtraction based on microphone signal estimation also suppresses the background noise introducing unpleasant musical noise. To reduce the modulations of the background noise, a spectral flooring is applied to the gain computation in Eq. (4). To this end in one implementation, G(κ,m) is computed based on the instantaneous magnitudes of |E(κ,m)|, |D̂$_r$(κ,m)|, and |N̂(κ,m)| with α=1 in Eqs. (5), (6), and (7), respectively.

1.2.1 Estimating the Residual Echo Component

Neglecting the delay effect of the acoustic echo and considering correlated speaker and residual echo signals under harmonic distortion, the speaker signal at frequency f affects the residual echo signal at frequencies f, 2 f, 3 f, etc. This effect can be described with a linear additive model:

$$\left|\hat{D}_r(\kappa, m)\right| = \sum_{i=1}^{M} \sum_{j=1}^{H} \sum_{k=-K}^{K} \delta(i, j, k, m) W_R(i, j, k) |X'(\kappa, i)| \quad (8)$$

where $$\delta(i, j, k, m) = \begin{cases} 1 & \text{if } i \times j + k = m \\ 0 & \text{otherwise} \end{cases} \quad (9)$$

and i is the fundamental frequency band, M is the number of sub-bands, j is the harmonic, m is the sub-band of interest, H is the number of harmonics considered (which was no more than 10 in tested embodiments), 2K+1 is the length of the harmonic search window, W$_R$(i,j, k) are the parameters of the HDRES model and X'(κ,i) is a transformed version of the speaker signal at frame index κ, frequency i. When dealing with a discretized version of the signal, the frequency domain transform of each harmonic can span several bands and can be displaced with respect to the integer division/multiplication. To handle echo leakage from adjacent sub-bands, it is possible to set K=1. It should be noted that searching for the potential bands for each harmonic (i.e., δ(i, j, k, m)=1) can be implemented very efficiently by considering a fundamental frequency then calculating the window of bands surrounding each possible harmonic. In other words, the actual implementation of Eq. (8) is sparse. For example, suppose the selected microphone signal sub-band m is 245 out of a maximum of 320 possible sub-bands. Sub-band 245 corresponds to the frequency 6125 hertz for a 16 kilohertz sampling rate. The first prescribed speaker sub-band is i=1 in Eq. (9). When the j=1 (the signal itself) is selected for k=0, this corresponds to determining the amount of echo in the microphone signal sub-band due to speaker signal in sub-band m=245. The echo in the microphone signal at sub-band 245 may also be due the first harmonic of the speaker signal at 3062.5 hertz which is half way between sub-bands 122 and 123. As a result, the combinations of i=122, j=2 and k=1 and i=123, j=2 and k=−1 may both contribute echo to the sub-band 245 in the microphone signal. With K=1, only the fundamental speaker sub-band 82 with j=−1 will contribute to the echo at microphone sub-band 245 since 82*3=246 and 81*3=243.

In one implementation, the regression is performed using the frequency-domain transforms of a single segment of the speaker signal and the microphone signal. Ideally, the magnitude regression in Eq. (8) would be with respect to time (i.e., multiple speaker frames) in addition to the harmonics, but this is prohibitive in terms of CPU consumption. Furthermore, the speaker and the residual echo signals must be correlated, but the combination of the acoustic echo path and the hardware produces a delay between both signals which may be difficult to estimate. It is desired to avoid expensive cross correlation computations. An approximation which addresses both issues is to compute the regression using a normalized transformation based on the delayed speaker signal, |X'(κ,i)|, weighted by the linear AEC taps weights as:

$$|X'(\kappa, i)| = \sum_{t=0}^{T-1} L(t, i) |X(\kappa - t, i)| \quad (10)$$

where the corresponding, normalized weighting factor L(t,i) is:

$$L(t, i) = \frac{|W_L(t, i)|}{\sum_{j=0}^{T-1} |W_L(j, i)|} \quad (11)$$

and W$_L$ is the weight matrix of the linear AEC.

1.3 HDRES Process

Figure 2A:
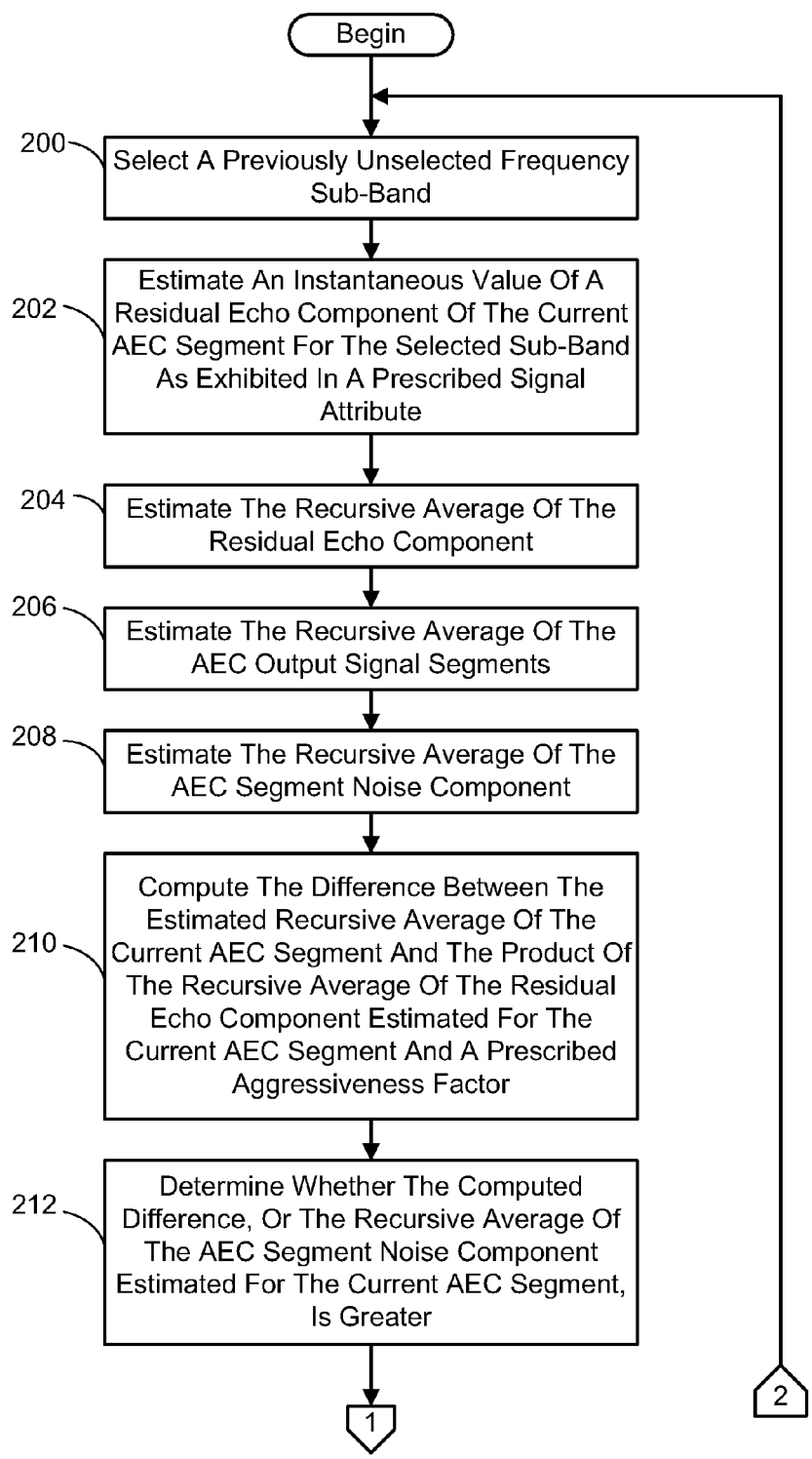
FIGS. 2A-B shows a flow chart diagramming one embodiment of a HDRES process employed by the RES module of FIG. 1 for suppressing the portion of the near-end microphone signal corresponding to a playback of the speaker audio signal that was not suppressed by the AEC module, including harmonic distortion found in the microphone signal owing to the speaker audio signal.
Figure 2B:
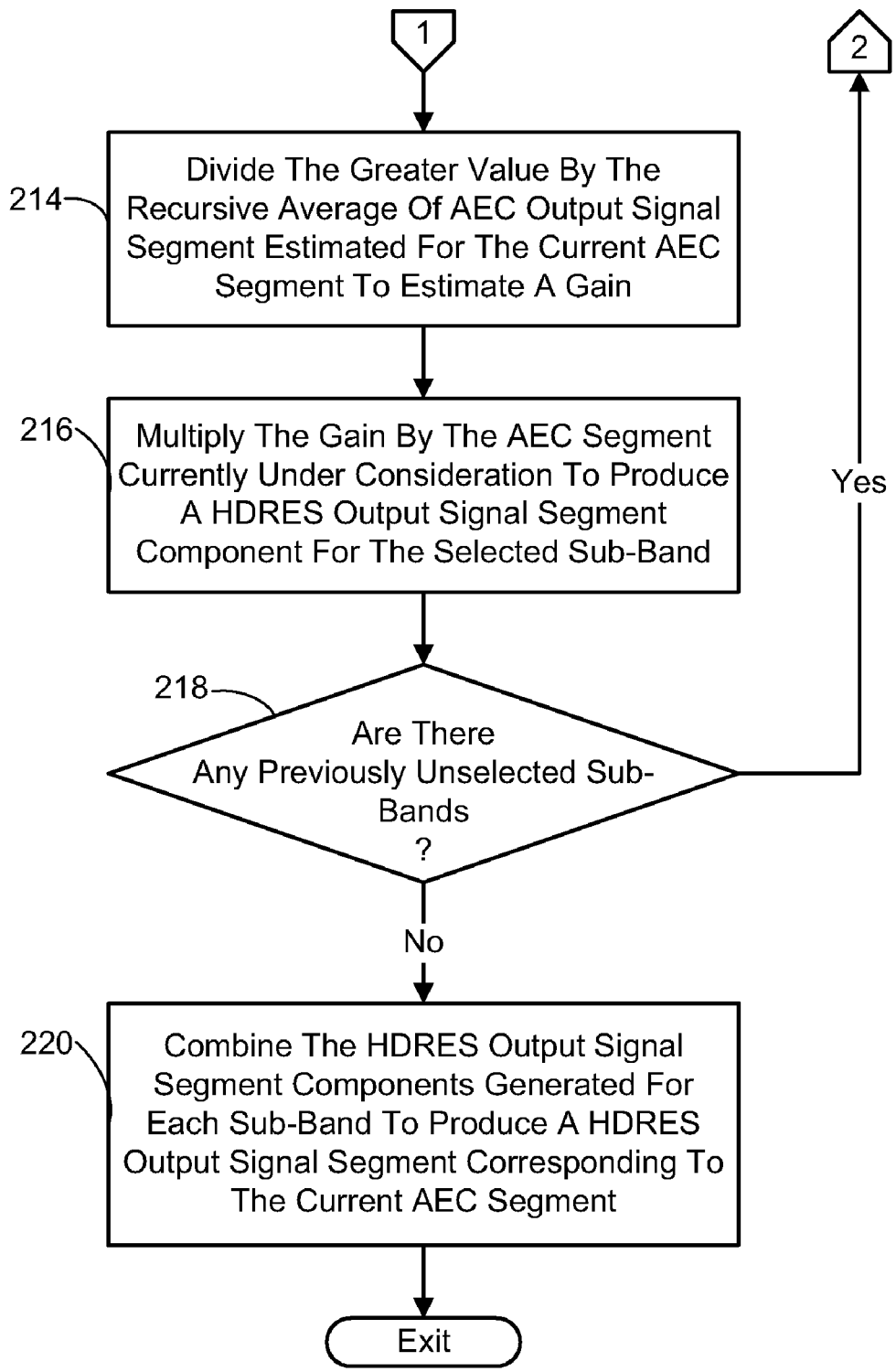

Referring to FIGS. 2A and 2B, one way of implementing the above-described HDRES technique embodiments is using the following process. The end result of the process is to produce a HDRES output in which the residual echo component remaining in the AEC output signal is suppressed. This is accomplished by processing the AEC output signal on a segment-by-segment basis as it is generated, where each segment represents a prescribed period of time of the AEC output signal (e.g., a prescribed frame of the signal). For each segment of the AEC output signal (hereinafter referred to as the AEC segment under consideration or the current AEC segment), the process first entails selecting a previously unselected frequency sub-band from a set of pre-defined sub-bands within a prescribed overall frequency range (200). For example, if the microphone and speaker signals are sampled at 16 kilohertz, the prescribed overall frequency range may be 50-7000 hertz. An instantaneous value of a residual echo component of the AEC segment under consideration for the selected sub-band is then estimated as exhibited in a prescribed signal attribute (202). In tested embodiments, the signal attribute was magnitude as shown in Eqs. (8) and (9). However, other attributes such as power could be employed instead.

Figure 3:
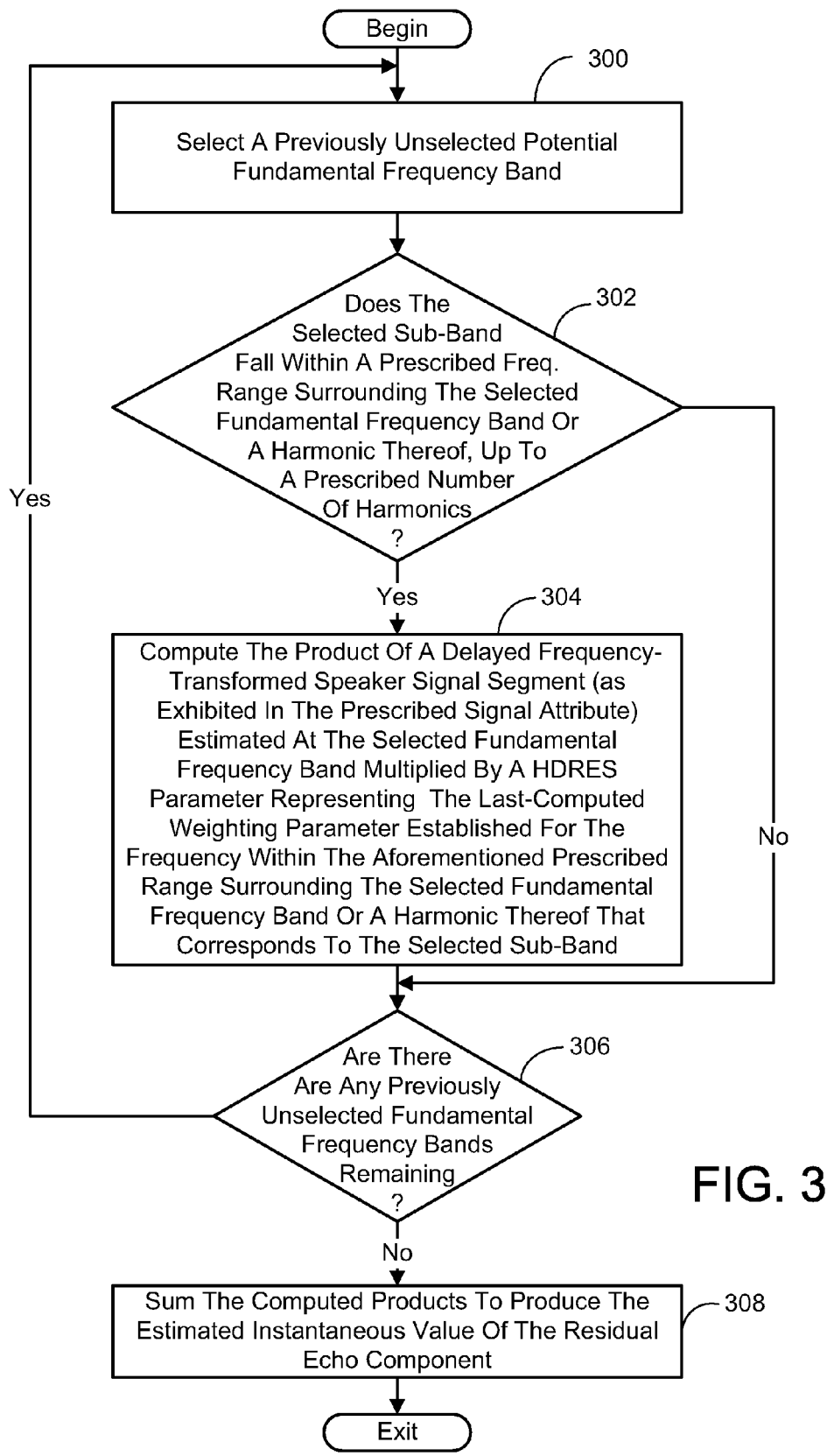
FIG. 3 shows a flow chart diagramming one way of estimating an instantaneous value of the residual echo component for use in the HDRES process of FIGS. 2A-B.
Figure 4A:
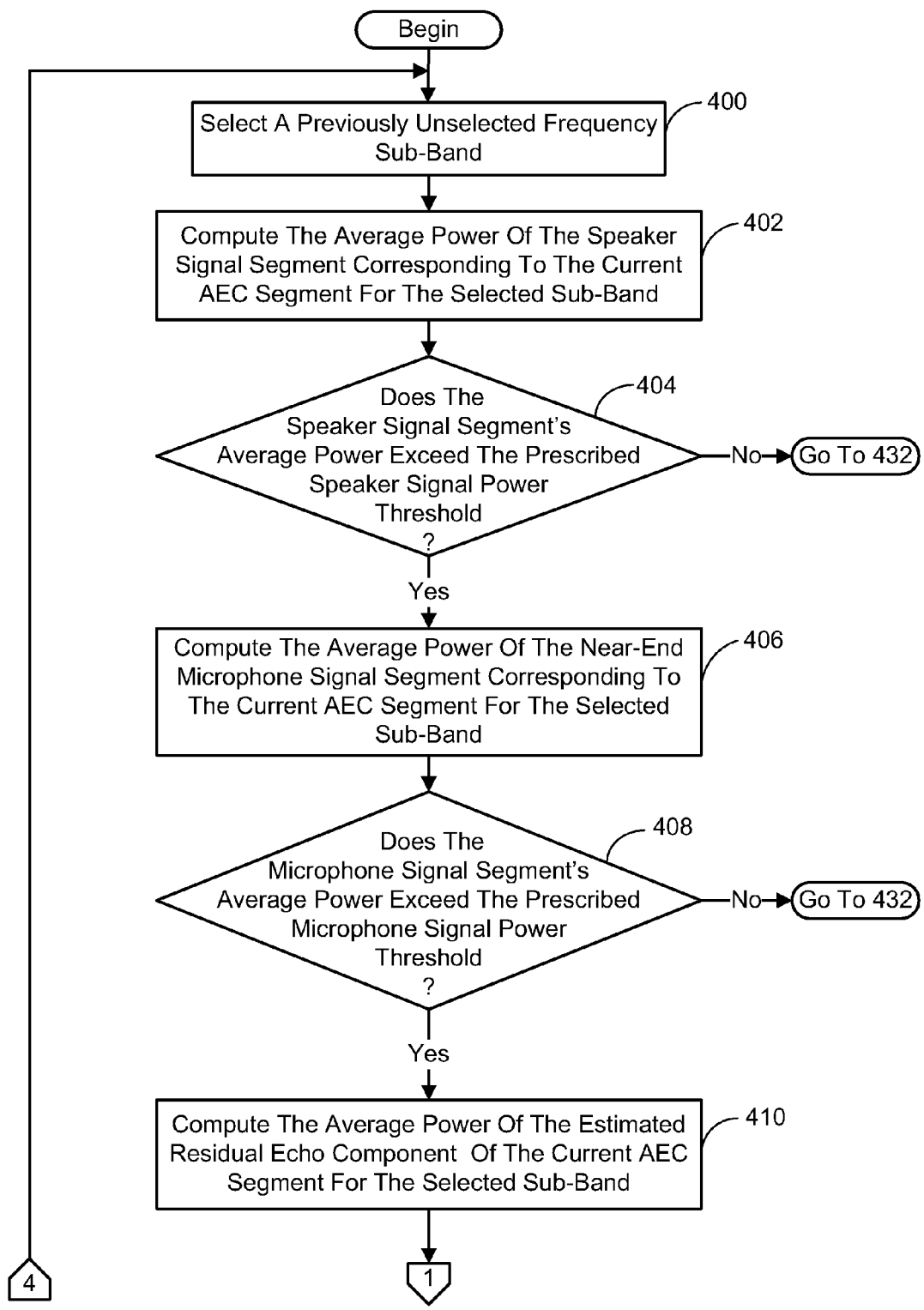
FIGS. 4A-D shows a flow chart diagramming one embodiment of adapting a set of HDRES parameters used to estimate the instantaneous value of the residual echo component for use in processing subsequent AEC segments.
Figure 4B:
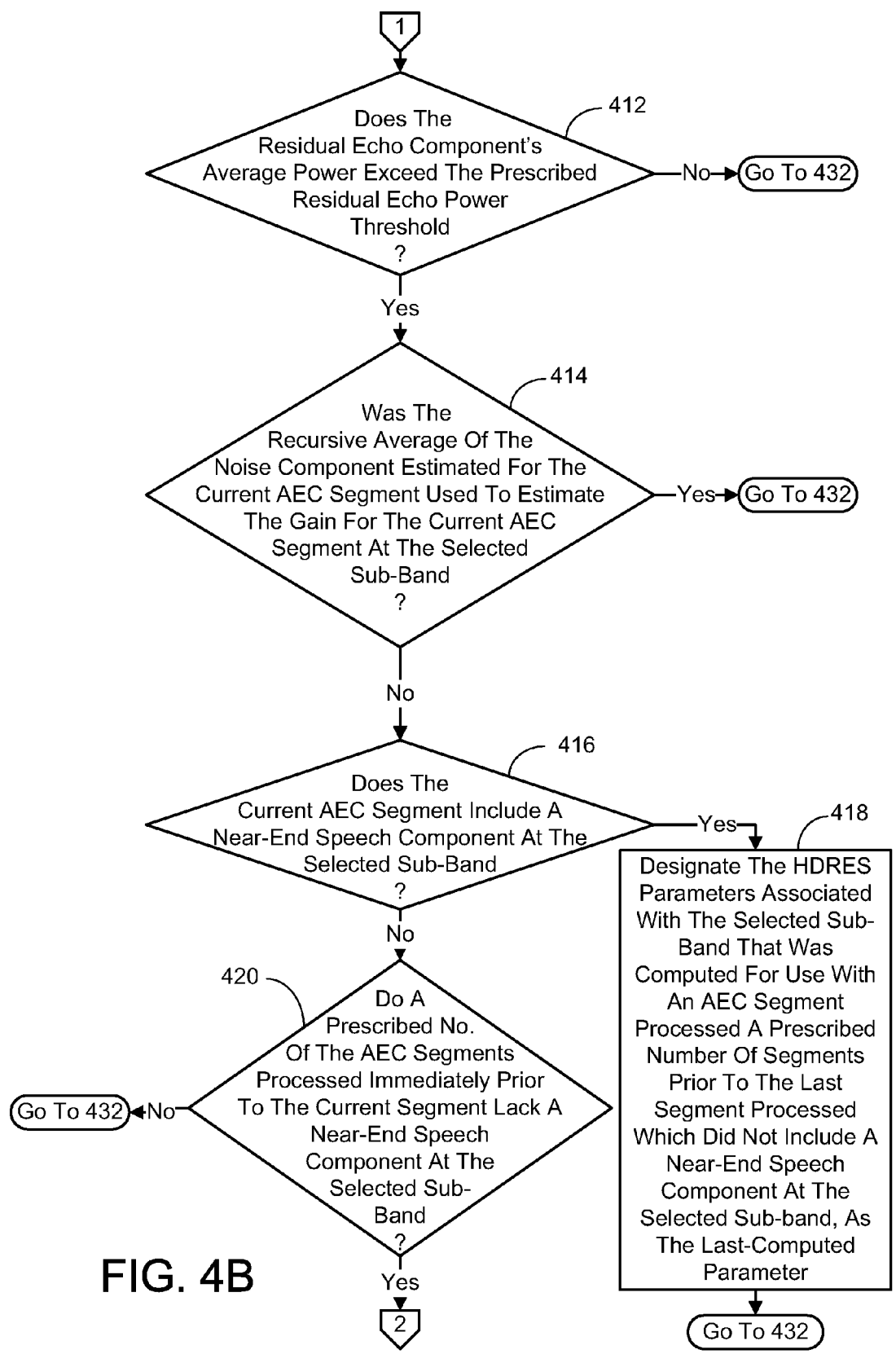
Figure 4C:
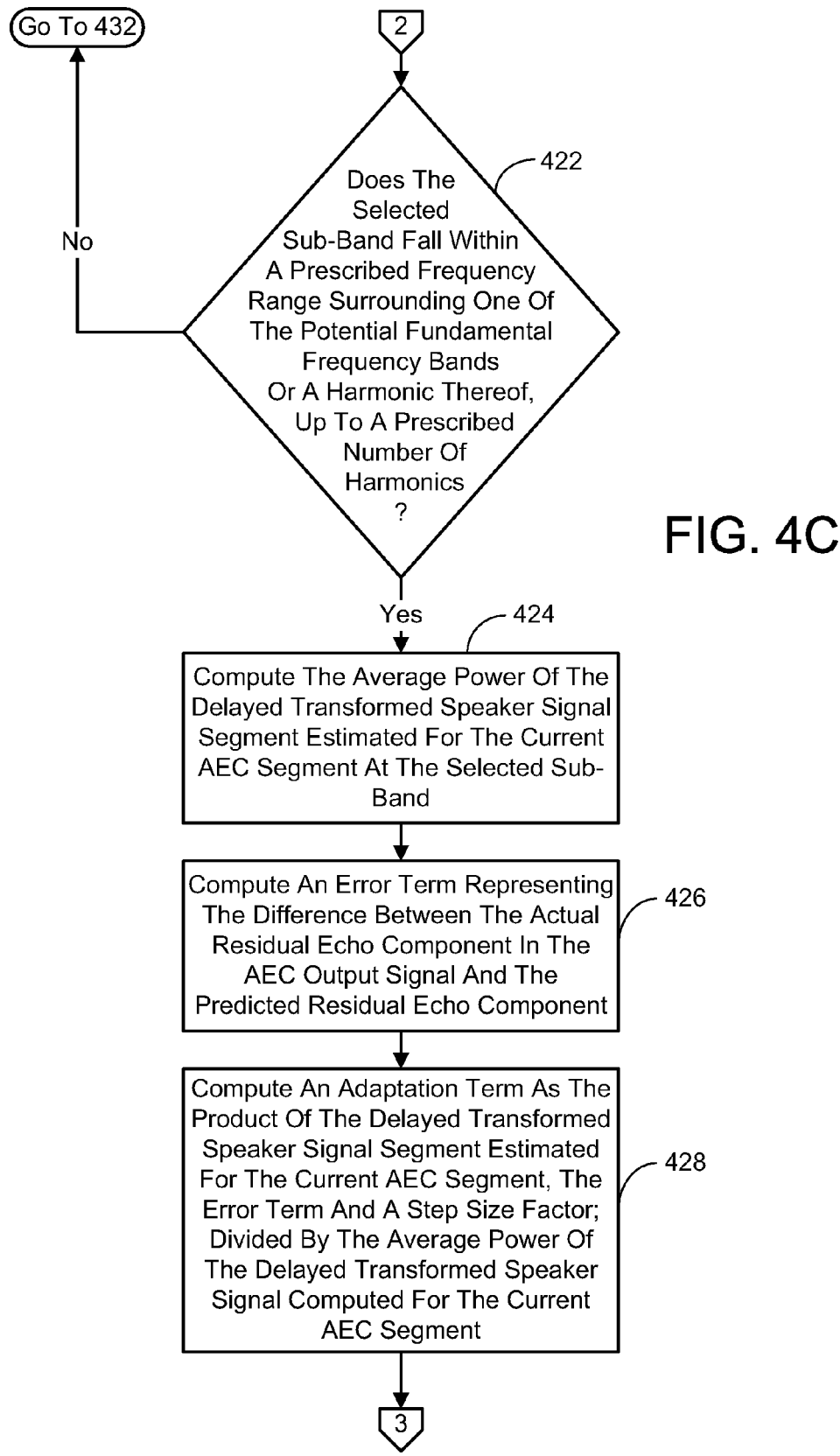
Figure 4D:
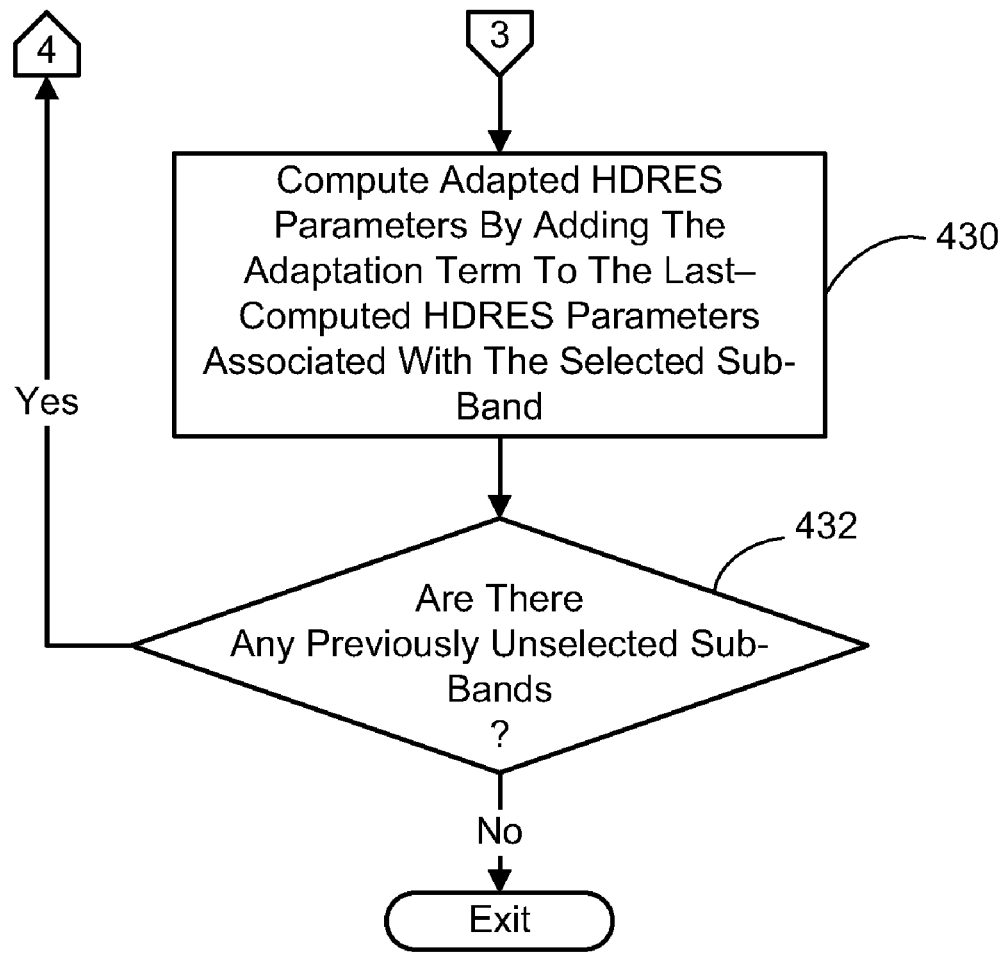

Before continuing with the description of the foregoing process for generating the HDRES output, a way of estimating the instantaneous value of the residual echo component based on Eqs. (8) and (9) will be described. Referring to FIG. 3, this estimation begins with selecting a potential fundamental frequency band from a prescribed set of fundamental frequency bands contained within the aforementioned overall frequency range (300). In this embodiment, the potential fundamental frequency bands are simply the aforementioned prescribed sub-bands. It is then determined if the selected sub-band falls within a prescribed frequency range surrounding the selected fundamental frequency band or a harmonic thereof, up to a prescribed number of harmonics (302). If so, then the product of a delayed frequency-transformed speaker signal segment (as exhibited in the prescribed signal attribute—e.g., magnitude) estimated at the selected fundamental frequency band multiplied by a HDRES parameter representing the last computed weighting parameter established for the frequency within the aforementioned prescribed range surrounding the selected fundamental frequency band or a harmonic thereof that corresponds to the selected sub-band, is computed (304). If the AEC segment under consideration is the first segment processed, the HDRES parameters are initialized to be 0. Thereafter, the last computed set is employed. The computation of these HDRES parameters will be described later in conjunction with an explanation of parameter adaptation.

If, however, it is determined the selected sub-band does not fall within the prescribed frequency range of the selected fundamental frequency band or one of its harmonics, no action is taken and it is then determined if there are any previously unselected fundamental frequency bands remaining (306). If there are fundamental frequency bands remaining, then actions 300 through 306 are repeated as appropriate. If there are no previously unselected fundamental frequency bands remaining then the instantaneous value of the residual echo component at the selected sub-band is estimated as the sum of the computed products (308), and the procedure ends.

It is noted that the foregoing procedure employs a delayed frequency-transformed speaker signal segment estimated at the selected fundamental frequency band as a multiplicand. One way of estimating this segment based on Eqs. (10) and (11) will now be described. Estimating the delayed frequency-transformed speaker signal segment for the selected fundamental frequency band generally involves computing the product of a segment of the frequency-transformed speaker signal as exhibited in the aforementioned prescribed signal attribute (e.g., magnitude) for the selected fundamental frequency band and a normalized weighting factor associated with the segment, for a prescribed number of segments starting with the current segment of the signal and moving back in time, to generate a set of products. These products are summed to generate the delayed frequency-transformed speaker signal segment estimate at the selected fundamental frequency band. The prescribed number of segments is made equal to the number of taps employed in the AEC module. The normalized weighting factor associated with each of the frequency-transformed speaker signal segments for each sub-band is computed by dividing the magnitude of the tap weight for the fundamental frequency band currently under consideration that was employed in the AEC module for a tap corresponding to the frequency-transformed speaker signal segment under consideration, by the sum of the magnitudes of the tap weights for the fundamental frequency band currently under consideration employed in the AEC module for all the taps.

Referring once again to FIGS. 2A and 2B, estimating the HDRES output for the AEC segment under consideration at the selected sub-band continues once the instantaneous residual echo component is estimated, with an estimation of a recursive average of the residual echo component (204) based on Eq. (6). More particularly, this recursive average is estimated by computing the product of the instantaneous estimate of the residual echo component as exhibited in the aforementioned signal attribute (e.g., magnitude) for the selected sub-band and a prescribed residual echo smoothing factor. This product is then added to the product of the recursive average of the residual echo component estimated for the immediately preceding AEC segment and one minus the prescribed residual echo smoothing factor.

Next, a recursive average of the AEC output signal segments is estimated (206) based on Eq. (5). This recursive average is estimated by computing the product of an instantaneous estimate of the AEC segment currently under consideration as exhibited in the aforementioned signal attribute (e.g., magnitude) for the selected sub-band and a prescribed AEC output signal smoothing factor. This product is then added to the product of the recursive average of the AEC segments estimated for the immediately preceding AEC segment and one minus the prescribed AEC output signal smoothing factor.

A recursive average of an AEC segment noise component is then estimated (208) based on Eq. (7). This recursive average is estimated by computing the product of an estimate of a noise floor as exhibited in the aforementioned signal attribute (e.g., magnitude) for the AEC segment under consideration at selected sub-band and a prescribed noise component smoothing factor. This product is then added to the product of the recursive average of the AEC segment noise component estimated for the immediately preceding AEC segment at selected sub-band and one minus the prescribed noise component smoothing factor. The forgoing noise floor estimate can be computed using any appropriated method. In tested embodiments, the noise floor was set to smallest noise component magnitude for the selected sub-band found in the last few AEC segments processed.

Once the foregoing recursive averages have been estimated, an estimate of a gain is computed for the current AEC segment at the selected sub-band based on Eq. (4). This gain, when applied to the current AEC segment suppresses the residual echo component for the selected sub-band. More particularly, the difference between the estimated recursive average of the current AEC segment and the product of the recursive average of the residual echo component estimated for the current AEC segment and a prescribed aggressiveness factor, is computed (210). It is then determined whether the computed difference, or the recursive average of the AEC segment noise component estimated for the current AEC segment, is greater (212). The greater of the two is then divided by the recursive average of AEC output signal segment estimated for the current AEC segment (214). The result is the aforementioned gain. It is noted that in an alternate implementation, the recursive average of the AEC segment noise component is first multiplied by a confidence factor prior to being compared to the computed difference to determine which is greater. In tested embodiments, a factor of 0.9 was employed. Once the gain has been estimated, it is multiplied by the AEC segment currently under consideration to produce a HDRES output signal segment component for the selected sub-band (216) based on Eq. (3). The residual echo for the selected sub-band and the harmonics of the lower frequency components are suppressed in this HDRES output signal segment.

It is next determined if there are any remaining previously unselected sub-bands (218). If so, actions 200 through 218 are repeated until there are no unselected sub-bands left. The HDRES output signal segment components generated for each previously selected sub-band are then combined, and the resulting signal is designated as the HDRES output signal segment corresponding to the current AEC segment (220). At that point, the entire process is repeated for the next AEC segment.

It is noted that the foregoing recursive average computations involves using a recursive average estimated during the processing of the immediately preceding AEC segment. In the case of the first segment to be processed previous segment's recursive averaged is replaced with an initialization term. In tested embodiments a zero average was employed.

It is also noted that the foregoing smoothing factors used to compute the recursive averages can all be the same value (as in tested embodiments) or one or more of the smoothing factors can be different values as desired. Each of the smoothing factors can vary between about 0.05 to about 1.0 depending on the application. The greater the factor is, the faster the recursive averages will converge as the successive AEC segments are processed. However, noise can become an issue with greater smoothing factors. Smaller factors ensure a greater degree of immunity to noise, but will converge more slowly.

1.4 Adaptive HDRES

As indicated previously, the HDRES parameters used to estimate the instantaneous value of the residual echo component represent the last computed weighting parameters established for the selected sub-band, if that sub-band falls within the prescribed frequency range of one of the selected fundamental frequency bands or their harmonics. An opportunity exists after processing each AEC segment to update (i.e., adapt) the HDRES parameters to better suppress the residual echo component in the next AEC segment processed. This adaptation will now be described.

Vibration of the enclosure is usually only produced with high powered signals. Thus, harmonic distortion is only noticeable when the magnitude of one or more frequencies of the speaker signal is high. To avoid incorrect adaptation of the model when the HD effect is not present, an adaptive threshold is introduced for the speaker signal power in order to predict if a given frequency would produce harmonics. This threshold is based on the average power of the speaker signal. As HDRES is designed to attenuate high-powered frequencies, a threshold is also applied to the microphone and the residual signal: that is, the filtering process is applied when both the speaker and the microphone signals for the particular band are above given thresholds. Also, the weights of the model are adapted only when the residual signal is not negligible.

Since the embodiments of the HDRES technique described herein employ a linear model with respect to harmonics in the transformed speaker signal, any linear adaptive process can be used to update them. In one implementation, a normalized, least mean square (NLMS) process was used as:

$$\xi(\kappa,m)=|E(\kappa,m)|-|\hat{D}_R(\kappa,m)| \quad (12)$$

$$W_R(i,j,k) \leftarrow W_R(i,j,k) + \frac{\mu}{\overline{P}(\kappa,m)}|X'(\kappa,m)|\xi(\kappa,m) \quad (13)$$

where m=ij+k, μ is the step size, and the average power in the transformed speaker signal is:

$$\overline{P}(\kappa,m)=(1-\rho)\overline{P}(\kappa-1,m)+\rho|X'(\kappa,m)|^2 \quad (14)$$

The term ρ in Eq. (14) is a prescribed delayed transformed speaker signal smoothing factor.

HDRES can be sensitive to double talk detection. If adaptation occurs when near-end voice is present, even for a short period of time, the near-end voice distortion increases considerably. Since most double talk detectors are based on averaged signal statistics (e.g. speaker, microphone, error), it takes a few frames in order to detect a change. Besides, spurious short single-talk segments can be incorrectly detected in the middle of long double-talk segments. To cope with these effects, two simple, yet effective mechanisms are proposed—namely adaptation rollback and hysteresis control. Assuming that the last adaptation steps before a change from single-talk to double-talk were incorrect, adaptation rollback consists of discarding the last $T_1$ adaptation steps before the double-talk detector transitions from single-talk to double-talk. This mechanism is implemented by keeping a window of the last $T_1$ instances of the weight matrix. On the other hand, hysteresis control is simply implemented by preventing adaptation when going from double-talk to single talk and enabling adaptation after $T_2$ consecutive frames are classified as single-talk.

Given the foregoing, one way of implementing the HDRES parameter adaptation is using the following process. Referring to FIGS. 4A through 4D, the process entails first selecting a previously unselected frequency sub-band from the set of pre-defined sub-bands within the prescribed overall frequency range (400). The average power of the speaker signal segment corresponding to the current AEC segment is then computed for the selected sub-band (402). It is next determined if the speaker signal segment's average power for the selected sub-band exceeds a prescribed speaker signal power threshold (404). If the speaker signal power threshold is not exceeded, the HDRES parameters associated with the selected sub-band are not adapted and the process skips to action (432). In one embodiment, the HDRES parameters that are associated with a selected sub-band are all those that correspond to frequencies falling within the prescribed frequency range surrounding one of the aforementioned fundamental frequency bands or their harmonics in which the selected sub-band also falls. If the speaker signal power threshold is exceeded, however, the average power of the near-end microphone signal segment corresponding to the current AEC segment is computed for the selected sub-band (406). It is then determined if the near-end microphone segment's average power exceeds a prescribed microphone signal power threshold (408). If the microphone signal power threshold is not exceeded, the HDRES parameters associated with the selected sub-band are not adapted and the process skips to action (432). If the microphone signal power threshold is exceeded, the average power of the estimated residual echo component of the current AEC segment is computed for the selected sub-band (410). It is then determined if the estimated residual echo component's average power exceeds a prescribed residual echo power threshold (412). If the residual echo power threshold is not exceeded, the HDRES parameters associated with the selected sub-band are not adapted and the process skips to action (432).

If the residual echo power threshold is exceeded, it is then determined if the recursive average of the noise component estimated for the current AEC segment was used to estimate the gain for the current AEC segment at the selected sub-band (414). If so, the HDRES parameters associated with the selected sub-band are not adapted and the process skips to action (432). However, if the recursive average of the noise component was not used to estimate the gain, then it is determined if the AEC segment currently under consideration includes a near-end signal component at the selected sub-band (416). If it does, the HDRES parameters associated with the selected sub-band are not adapted. In this case there are two options. The first (which is not shown) is to use the last-computed HDRES parameters in processing the AEC segment. The second option (which is shown) is to designate the HDRES parameters associated with the selected sub-band that were computed for use with an AEC segment processed a prescribed number of segments prior to the last segment processed which did not include a near-end signal component at the selected sub-band, as the last-computed parameters to be used to process the AEC segment (418).

On the other hand, if it is determined the AEC segment currently under consideration does not include a near-end signal component at the selected sub-band; the HDRES parameters may be adapted. This entails determining if a prescribed number of AEC segments (e.g., 30 segments) processed immediately prior to the current segment also lacked near-end signal components at the selected sub-band (420). If they did not, the HDRES parameters associated with the selected sub-band are not adapted and the process skips to action (432). The "last-computed" HDRES parameters are used to process the next AEC segment. If, however, the prescribed number of AEC segments processed immediately prior to the current segment did lack near-end signal components at the selected sub-band, it is determined if the selected sub-band falls within a prescribed frequency range surrounding one of a prescribed set of potential fundamental frequency bands or harmonics thereof, up to a prescribed number of harmonics (422). In this embodiment, the potential fundamental frequency bands are simply the aforementioned prescribed sub-bands. If not, the HDRES parameters associated with the selected sub-band are not adapted and the process skips to action (432). If, however, it is determined the selected sub-band does fall within the prescribed frequency range of one of the prescribed set of potential fundamental frequency bands or harmonics thereof, then the average power of the delayed transformed speaker signal segment previously estimated for the current AEC segment at the selected sub-band, is computed (424). One way of computing the average power of the delayed transformed speaker signal segment based on Eq. (14) is to first compute the product of the average power of the delayed transformed speaker signal segment computed for the immediately preceding AEC segment at the selected sub-band (or an initialization value of square of the delayed transformed speaker signal segment if this is the first segment considered), and one minus a prescribed delayed transformed speaker signal smoothing factor. Next, the product of the square of the delayed transformed speaker signal segment computed for the AEC segment at the selected sub-band, and the prescribed delayed transformed speaker signal smoothing factor, is computed. These products are summed to produce the average power value. Once the average power of the delayed transformed speaker signal segment has been computed, an error term, representing the difference between the actual residual echo component in the AEC output signal and the predicted residual echo component, is computed (426) as it would be exhibited in the aforementioned prescribed signal attribute (e.g., magnitude) at the sub-band under consideration. One way of computing this error term based on Eq. (12) is to subtract the instantaneous value of the residual echo component previously estimated for the current AEC segment at the selected sub-band as it would be exhibited in the aforementioned prescribed signal attribute (e.g., magnitude) from the previously-computed instantaneous value of the AEC output signal for the current AEC segment for that sub-band as it would be exhibited in the aforementioned prescribed signal attribute (e.g., magnitude). Next, an adaptation term is computed based on Eq. (13), as the product of the delayed transformed speaker signal segment estimated for the current AEC segment, the error term and a step size factor; divided by the average power of the delayed transformed speaker signal computed for the current AEC segment (428). Adapted HDRES parameters are then computed based on Eq. (13) by adding the adaptation term to the last-computed HDRES parameters associated with the selected sub-band (430). The adapted HDRES parameters are then ready for use in processing the next AEC segment for the selected sub-band, if appropriate. It is next determined if there are any remaining previously unselected sub-bands (432). If so, actions 400 through 432 are repeated until there are no unselected sub-bands left, at which point the adaptation process ends.

It is noted that while the foregoing HDRES parameter adaptation process is described as being performed after the HDRES output signal segment is generated, this need not be the case. Alternatively, the HDRES parameters associated with a currently selected sub-band could be computed before selecting a new sub-band and computing the HDRES output signal component for the new sub-band. In this case the foregoing procedure, less action 400 and the repeated loops, would be performed prior to action 218 of FIG. 2B.

In regard to the delayed transformed speaker signal smoothing factor, this could theoretically range from 0 to 1.0. A factor set close to 1.0 would marginalize the effect that the above-described average power of the delayed transformed speaker signal segment would have on the HDRES parameter adaptation. This might be appropriate if there is a low confidence in the accuracy of the delayed transformed speaker signal segment estimate. On the other hand, a value close to 0 would maximize the impact that the delayed transformed speaker signal segment average power has on the HDRES parameter adaptation. A good compromise is a value of about 0.5. This would be particularly good choice when the recursive terms have converged to a steady state condition. However, in an alternate embodiment, the delayed transformed speaker signal smoothing factor could be varied with time. At first, or after a change in the conditions, the recursive terms will not have converged and confidence would be low. Thus, the smoothing factor could be set close to 1.0, and as more and more AEC segments are processed, the factor would be increase to a maximum value (e.g., 0.5).

In regard to the step size factor, this could range from about 0.001 to about 0.5 with satisfactory results. This factor generally controls the degree to which the adaptation term is allowed to change the resulting adapted HDRES parameters. In tested embodiments, a value of 0.3 was employed with success.

2.0 Repeated Application of HDRES

Figure 5:
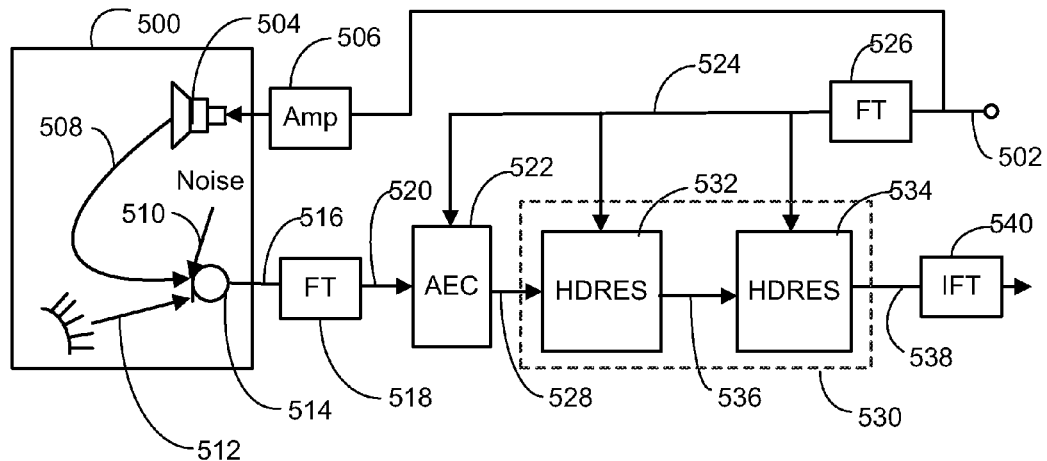
FIG. 5 is a block diagram depicting an overall echo reduction scheme including a RES module that includes two sequential HDRES sub-modules.

It can be intuitively presumed that repeated application of the foregoing HDRES technique embodiments, will lead to successive reduction in the residual echo. Thus, when extra processing time and costs are acceptable it is envisioned that the HDRES would be run at least twice. This modified RES technique is illustrated in FIG. 5 in an embodiment having two HDRES stages. As before, the speaker signal 502 is received and played back in the space represented by near-end block 500 via loudspeaker 504. Typically, this signal 502 will be amplified by an amplifier 506 prior to being played by the loudspeaker 504. The speaker signal audio playback 508, as well as the ambient noise 510 in the near-end space and near-end speech 512 is picked up by the microphone 514 which produces a microphone signal 516.

The microphone signal 516 is first fed through a frequency transform (FT) module 518, which in one embodiment employs a modulated complex lapped transform (MCLT). However, other frequency domain transforms such as the short-time Fourier transform (STFT) or the Discrete Fourier Transform (DFT) can be used instead, if desired.

The transformed microphone signal 520 is next fed into an AEC module 522, along with a frequency-transformed version of the speaker signal 524. The speaker signal 502 is transformed by passing it through a FT module 526 identical to module 518 (e.g., MCLT, STFT, DFT).

The AEC module 522 suppresses a part of the speaker signal audio playback picked up by the microphone. The output of the AEC module 522 is the aforementioned AEC output signal 528, which is in turn fed into the RES module 530 that in this embodiment includes two HDRES sub-modules 532, 534 connected in series. The first HDRES sub-module 532 uses the AEC output signal 528 and the transformed speaker signal 524 to produce the initial HDRES output signal 536 in the manner described previously. This initial HDRES output signal 536 is then fed into the second HDRES sub-module 534 along with the transformed speaker signal 524. The second HDRES sub-module 534 repeats the HDRES, except using the initial HDRES output signal 536 in lieu of the AEC output signal 528. The output of the second HDRES sub-module 534 is the final RES module output signal 538. However, as indicated there could also be more than two HDRES stages (not shown). In that case, additional HDRES sub-module(s) are added with the output of the immediately preceding HDRES sub-module being fed into the next sub-module, along with the transformed speaker signal. The final RES module output signal is then output by the last HDRES sub-module in the series. Optionally, the RES module output signal 538 is fed through an inverse frequency transform (IFT) module 540 (e.g., an inverse MCLT) to transform it to the time domain.

3.0 Application to Stereo AEC

Figure 6:
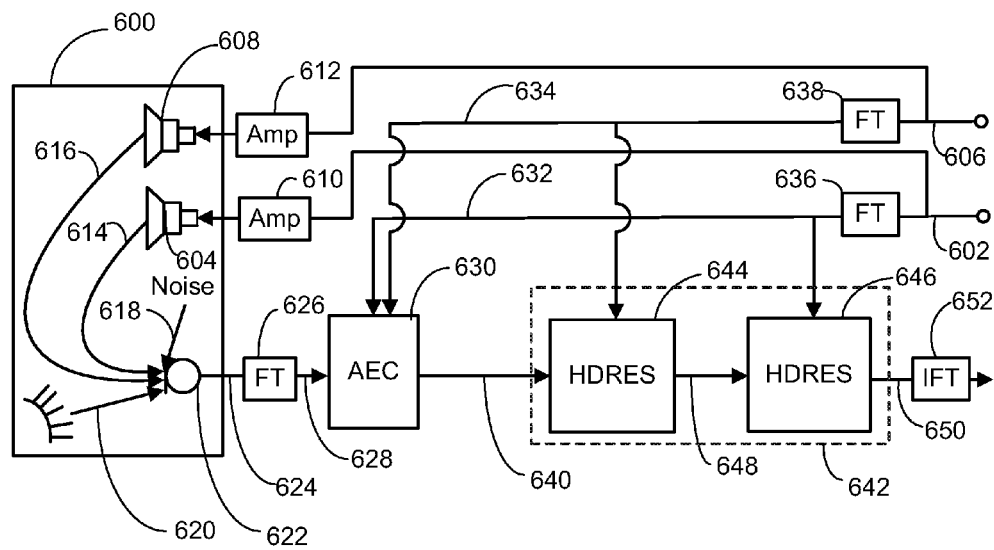
FIG. 6 is a block diagram depicting an overall echo reduction scheme for stereo playback scenarios including a RES module that includes two sequential HDRES modules, where the first HDRES module handles the left channel and the second HDRES module handles the right channel.

The HDRES technique embodiments described herein can also be applied to stereo AEC in two ways, both involving two passes, similar to the repeated application embodiment just described. The HDRES approach has the advantage of naturally handling correlations between the right and left channels by removing them in two passes. Generally, there is no difference in the processing itself, only a difference in which signals are input to the HDRES sub-modules. In the first approach illustrated in FIG. 6, HDRES is applied to the AEC output based on the left channel speaker signal in the first pass, and then the right channel speaker signal in the second pass. More particularly, the right channel speaker signal 602 is received and played back in the space represented by near-end block 600 via loudspeaker 604, while the left channel speaker signal 606 is received and played back in the space via loudspeaker 608. Typically, these signals 602, 606 will be amplified by respective amplifiers 610, 612 prior to being played by the loudspeakers 604, 608. The right and left channel signal audio playbacks 614, 616, as well as the ambient noise 618 in the near-end space and near-end speech 620 are picked up by the microphone 622, which produces a microphone signal 624.

The microphone signal 624 is first fed through a frequency transform (FT) module 626, which in one embodiment employs a modulated complex lapped transform (MCLT). However, other frequency domain transforms such as the short-time Fourier transform (STFT) or the Discrete Fourier Transform (DFT) can be used instead, if desired.

The transformed microphone signal 628 is fed into a stereo AEC module 630, along with frequency-transformed versions of both the right and left channel speaker signals 632, 634. The right and left channel speaker signals 632, 634 are transformed by passing them through respective FT modules 636, 638 that are identical to module 626 (e.g., MCLT, STFT, DFT).

The stereo AEC module 630 suppresses a part of the left and right speaker signal audio playback picked up by the microphone 622. The output of the AEC module 630 is the AEC output signal 640, which is in turn fed into the RES module 642 that in this embodiment includes two HDRES sub-modules 644, 646. The first HDRES sub-module 644 uses AEC output signal and the transformed left channel speaker signal 634 to produce the first HDRES output signal 648 in the manner described previously. This first HDRES output signal 648 is then fed into the second HDRES sub-module 646 along with the transformed right channel speaker signal 632. The second HDRES sub-module 646 applies HDRES to the first HDRES output signal 648. The output of the second HDRES sub-module 646 is the final RES module output signal 650. The foregoing is also applicable to multi-channel playback where the number of playback channels is greater than 2 (e.g. 5.1, 7.1, and so on). Generally, each playback channel is feed into a separate HDRES sub-module and the sub-modules are connected in series. Optionally, the RES module output signal 650 is fed through an inverse frequency transform (IFT) module 652 (e.g., an inverse MCLT, inverse STFT, inverse DFT) to transform it to the time domain.

Figure 7:
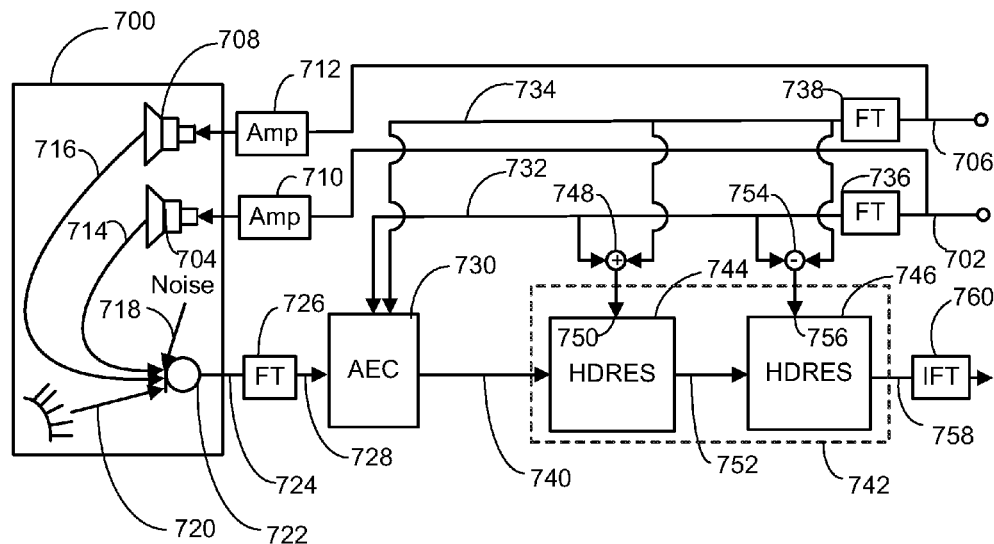
FIG. 7 is a block diagram depicting an alternate overall echo reduction scheme for stereo playback scenarios including a RES module involving two sequential HDRES module, where the first HDRES module inputs a sum of the left and right stereo channels and the second HDRES module inputs a difference of the left and right stereo channels.

In the second approach illustrated in FIG. 7, the HDRES is applied to the stereo AEC output based on the sum of the left and right channel speaker signals in the first pass and on the difference between the left and right channel speaker signals in the second pass. More particularly, as in the first embodiment, the right channel speaker signal 702 is received and played back in the space represented by near-end block 700 via loudspeaker 704, while the left channel speaker signal 706 is received and played back in the space via loudspeaker 708. Typically, these signals 702, 706 will be amplified by respective amplifiers 710, 712 prior to being played by the loudspeakers 704, 708. The right and left channel speaker signal audio playbacks 714, 716, as well as the ambient noise 718 in the near-end space and near-end speech 720 are picked up by the microphone 722, which produces a microphone signal 724.

The microphone signal 724 is first fed through a frequency transform (FT) module 726, which in one embodiment employs a modulated complex lapped transform (MCLT). However, other frequency domain transforms such as the short-time Fourier transform (STFT) or the Discrete Fourier Transform (DFT) can be used instead, if desired.

The transformed microphone signal 728 is fed into a stereo AEC module 730, along with frequency-transformed versions of both the right and left channel speaker signals 732, 734. The right and left channel speaker signals 732, 734 are transformed by passing them through respective FT modules 736, 738 that are identical to module 726 (e.g., MCLT, STFT, DFT).

The stereo AEC module 730 suppresses a part of the left and right speaker signal playback picked up by the microphone 722. The output of the AEC module 730 is the AEC output signal 740, which is in turn fed into the RES module 742 that in this embodiment includes first and second HDRES sub-modules 744, 746. In addition, the transformed right and left channel speaker signals 732, 734 are summed in summing module 748 and the resulting summed signal 750 is fed into the first HDRES sub-module 744. The first HDRES sub-module 744 uses the AEC output signal 740 and the summed channel signal 750 to produce the first HDRES output signal 752 in the manner described previously. This first HDRES output signal 752 is then fed into the second HDRES sub-module 746. In addition, the transformed right and left channel speaker signals 732, 734 are subtracted in the difference module 754 and the resulting difference signal 756 is fed into the second HDRES sub-module 746. The second HDRES sub-module 746 uses the first HDRES output signal 752 and the difference signal 756 to produce the final RES output signal 758 in the manner described previously. Optionally, the RES module output signal 758 is fed through an inverse frequency transform (IFT) module 760 (e.g., an inverse MCLT, inverse STFT, inverse DFT) to transform it to the time domain.

It is noted that the order in which the left and right channel far end signals are processed in the HDRES sub-modules in the first stereo HDRES embodiment or the order in which the summed and difference signals are processes in the HDRES sub-modules in the second stereo HDRES embodiment could be reversed from that described above if desired.

4.0 Application of LRRES Prior to HDRES

Figure 8:
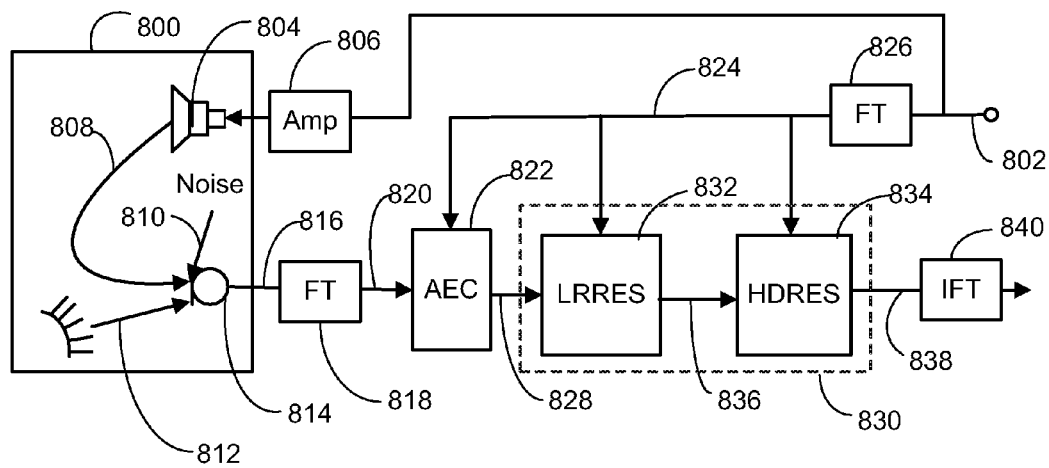
FIG. 8 is a block diagram depicting an overall echo reduction scheme including a RES module that includes a Linear Regression Residual Echo Suppression (LRRES) sub-module that acts to suppress a part of the residual echo component of the near-end microphone signal output from the AEC module, and a HDRES sub-module that suppresses a further part of the residual echo component in the signal output from the LRRES module, including harmonic distortion found in the signal.

Another embodiment that can be realized when extra processing time and costs are acceptable, involves applying Linear Regression Residual Echo Suppression (LRRES) to the output of the AEC module, and then applying HDRES to the output of the LRRES. This modified technique is illustrated in FIG. 8. As before, the speaker signal 802 is received and played back in the space represented by near-end block 800 via loudspeaker 804. Typically, this signal 802 will be amplified by an amplifier 806 prior to being played by the loudspeaker 804. The speaker signal audio playback 808, as well as the ambient noise 810 in the near-end space and near-end speech 812 is picked up by the microphone 814 which produces a microphone signal 816.

The microphone signal 816 is first fed through a frequency transform (FT) module 818, which in one embodiment employs a modulated complex lapped transform (MCLT). However, other frequency domain transforms can be used instead such as the short-time Fourier transform (STFT) or the Discrete Fourier Transform (DFT), if desired.

The transformed microphone signal 820 is fed into an AEC module 822, along with a frequency-transformed version of the speaker signal 824. The speaker signal 802 is transformed by passing it through a FT module 826 identical to module 818 (e.g., MCLT, STFT, DFT).

The AEC module 822 suppresses a part of the speaker signal audio playback picked up by the microphone. The output of the AEC module 822 is the aforementioned AEC output signal 828, which is in turn fed into the RES module 830 that in this embodiment includes an LRRES sub-module 832 followed by a HDRES sub-module 834 connected in series. The LRRES sub-module 832 uses the AEC output signal 828 and the transformed speaker signal 824 to produce the LRRES output signal 836. This LRRES output signal 836 is then fed into the HDRES sub-module 834 along with the transformed speaker signal 824. The HDRES sub-module 834 performs HDRES on the LRRES output signal 836. The output of the HDRES sub-module 834 is the final RES module output signal 838. Optionally, the RES module output signal 838 is fed through an inverse frequency transform (IFT) module 840 (e.g., an inverse MCLT, inverse STFT, inverse DFT) to transform it to the time domain.

5.0 The Computing Environment

A brief, general description of a suitable computing environment in which portions of the HDRES technique embodiments described herein may be implemented will now be described. The HDRES technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 9:
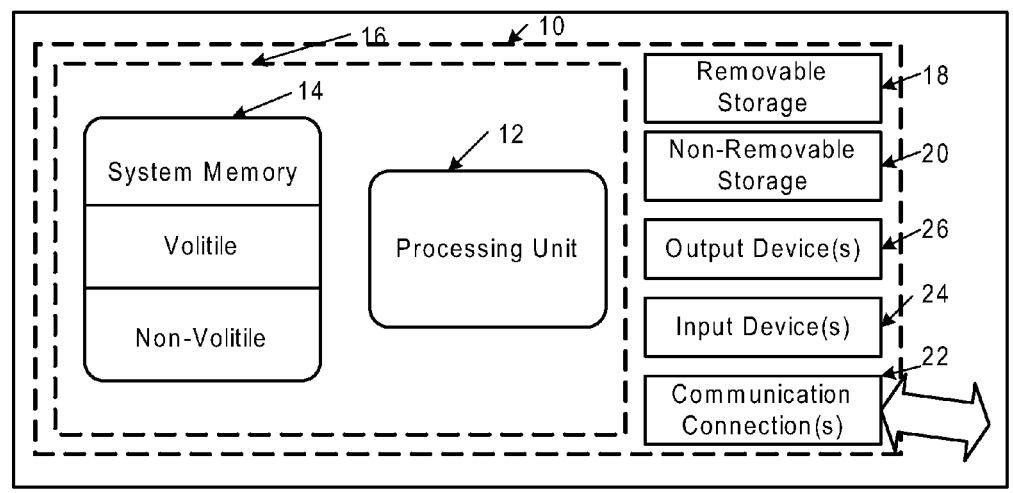
FIG. 9 is a diagram depicting a general purpose computing device constituting an exemplary system for implementing HDRES technique embodiments described herein.

FIG. 9 illustrates an example of a suitable computing system environment. The computing system environment is only one example of a suitable computing environment and is not intended to suggest any limitation as to the scope of use or functionality of HDRES technique embodiments described herein. Neither should the computing environment be interpreted as having any dependency or requirement relating to any one or combination of components illustrated in the exemplary operating environment. With reference to FIG. 9, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 9 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 9 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well know in the art and need not be discussed at length here.

The HDRES technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

6.0 Other Embodiments

It is noted that any or all of the aforementioned embodiments throughout the description may be used in any combination desired to form additional hybrid embodiments. For example, the RES module employing an LRRES stage followed by a HDRES stage described previously could be combined with the multi-channel embodiments.

In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A system for suppressing a portion of a microphone signal corresponding to a speaker audio signal played aloud in a space having a microphone therein which picks-up the speaker signal playback and generates a microphone signal, wherein a portion of the microphone signal that corresponds to the speaker audio signal playback comprises non-linear harmonic distortion, said system comprising:

an acoustic echo canceller (AEC) module which suppresses some parts of the speaker signal playback found in the microphone signal and generates an AEC output signal; and a harmonic distortion residual echo suppression (HDRES) module which accepts the AEC output signal and the speaker signal, and suppresses at least a portion of a residual part of the speaker audio signal playback found in the microphone signal left unsuppressed by the AEC module, as well as at least a portion of the harmonic distortion exhibited in the AEC output signal caused by the speaker audio signal playback, to produce a HDRES output signal, wherein the HDRES program module comprises for each prescribed time-length segment of the AEC output signal in the order it is generated, sub-modules which, for each frequency sub-band in a set of pre-defined sub-bands within a prescribed overall frequency range, estimate an instantaneous value of a residual echo component of the current AEC segment being processed for the sub-band under consideration as exhibited in a prescribed signal attribute, estimate a recursive average of the residual echo component for the current AEC segment at the sub-band currently under consideration, estimate a recursive average of the AEC output signal segments for the current AEC segment at the sub-band currently under consideration, estimate a recursive average of an AEC segment noise component for the current AEC segment at the sub-band currently under consideration, estimate a gain for the current AEC segment at the sub-band currently under consideration using the recursive average estimates, wherein the gain when applied to the current AEC segment suppresses the residual echo component at the sub-band currently under consideration, and compute the product of the gain estimate for the current AEC segment at the sub-band currently under consideration, and the current AEC segment, to generate a HDRES output signal segment component for the sub-band currently under consideration, and which, combine the HDRES output signal segment components generated for each sub-band to produce a HDRES output signal segment which represents the current AEC segment.

2. The system of claim 1, wherein the sub-module for estimating the instantaneous value of a residual echo component of the current AEC segment being processed for the sub-band under consideration comprises sub-modules for:

(a) selecting a previously unselected potential fundamental frequency band from a prescribed set of fundamental frequency bands contained within said overall frequency range;

(b) determining if the sub-band under consideration falls within a prescribed frequency range surrounding the selected fundamental frequency band or a harmonic thereof, up to a prescribed number of harmonics;

(c) whenever the sub-band under consideration falls within the prescribed frequency range surrounding the selected fundamental frequency band or a harmonic thereof, computing the product of a delayed frequency-transformed segment of the speaker audio signal as exhibited in the prescribed signal attribute and estimated at the fundamental frequency band, and a HDRES parameter representing the last computed weighting parameter established for the frequency within the aforementioned prescribed range surrounding the selected fundamental frequency band or a harmonic thereof that corresponds to the selected sub-band, is computed;

(d) determining if there are any previously unselected fundamental frequency bands remaining;

(e) whenever it is determined that there are previously unselected fundamental frequency bands remaining, repeating sub-modules (a) through (e); and (f) whenever it is determined that there are no more previously unselected fundamental frequency bands remaining, estimating the instantaneous value of the residual echo component for the sub-band under consideration to be the sum of the computed products.

3. The system of claim 2, wherein the sub-module for estimating the delayed frequency-transformed speaker signal segment, comprises sub-modules for:

for each of a prescribed number of segments of a frequency-transformed speaker signal starting with the current segment of the speaker signal and moving back in time, computing a product of the frequency-transformed speaker signal segment under consideration as exhibited in said prescribed signal attribute at the fundamental frequency currently under consideration and a normalized weighting factor associated with the segment, to generate a set of products; and summing the set of products to generate the delayed frequency-transformed speaker signal segment estimate at the fundamental frequency currently under consideration, wherein the prescribed number of segments is set to the number of taps associated with AEC module, and the normalized weighting factor associated with the segment the delayed frequency-transformed speaker signal under consideration is computed by dividing the tap weight for the fundamental frequency currently under consideration that was employed in the AEC module for a tap corresponding to the frequency-transformed speaker signal segment under consideration, by the sum of the tap weights for the fundamental frequency currently under consideration employed in the AEC module for all the taps thereof.

4. The system of claim 1, wherein the sub-module for estimating the recursive average of the residual echo component for the current AEC segment at the sub-band currently under consideration, comprises sub-modules for:

computing a product of the estimate of the instantaneous value of the residual echo component at the sub-band currently under consideration as exhibited in said signal attribute and a prescribed residual echo smoothing factor;

computing a product of a recursive average of the residual echo component estimated for the immediately preceding AEC segment at the sub-band currently under consideration, and one minus the prescribed echo residual smoothing factor; and summing the products to generate a recursive average of the residual echo component estimate for the current AEC segment at the sub-band currently under consideration.

5. The system of claim 1, wherein the sub-module for estimating the recursive average of the AEC output signal segments for the current AEC segment at the sub-band currently under consideration, comprises sub-modules for:
   computing a product of an instantaneous estimate of the current AEC segment as exhibited in said signal attribute at the sub-band currently under consideration, and a prescribed AEC output signal smoothing factor;
   computing a product of a recursive average of the AEC output signal segments estimated for the immediately preceding AEC segment at the sub-band currently under consideration, and one minus the prescribed AEC output signal smoothing factor; and
   summing the products to generate the recursive average of the AEC output signal segments for the current AEC segment at the sub-band currently under consideration.

6. The system of claim 1, wherein the sub-module for estimating the recursive average of the AEC segment noise component for the current AEC segment at the sub-band currently under consideration, comprises sub-modules for:
   computing a product of an estimate of a noise floor as exhibited in said signal attribute for the current AEC segment at the sub-band currently under consideration, and a prescribed noise component smoothing factor;
   computing a product of a recursive average of the AEC segment noise component estimated for the immediately preceding AEC segment at the sub-band currently under consideration, and one minus the prescribed noise component smoothing factor; and
   summing the products to generate the recursive average of the AEC segment noise component for the current AEC segment at the sub-band currently under consideration.

7. The system of claim 1, wherein the sub-module for estimating the gain for the current AEC segment at the sub-band currently under consideration, comprises sub-modules for:
   computing the difference between the estimated recursive average of the current AEC segment at the sub-band currently under consideration and the product of the recursive average of the residual echo component estimated for the current AEC segment at the sub-band currently under consideration and a prescribed aggressiveness factor;
   determining whether the computed difference, or the recursive average of the AEC segment noise component estimated for the current AEC segment at the sub-band currently under consideration, has a greater value; and
   dividing the determined greater value by the recursive average of AEC segments estimated for the current AEC segment at the sub-band currently under consideration to generate the gain estimate for the current AEC segment at the sub-band currently under consideration.

8. The system of claim 2, further comprising prior to executing the program module for combining the HDRES output signal segment components generated for each sub-band to produce a HDRES output signal segment, executing sub-modules for:
   determining if the HDRES parameters used to estimate the instantaneous value of the residual echo component for the sub-band currently under consideration are to be adapted; and
   whenever the HDRES parameters are to be adapted, adapting the HDRES parameters for use in estimating the instantaneous value of a residual echo component of the next AEC segment to be processed for the sub-band under consideration.

9. The system of claim 8, wherein the sub-module for determining if the HDRES parameters are to be adapted, comprises sub-modules for:
   computing the average power for the sub-band under consideration of the speaker signal segment which corresponds to the current AEC segment;
   determining if the speaker signal segment's average power exceeds a prescribed speaker signal power threshold;
   whenever the speaker signal segment's average power does not exceed the speaker signal power threshold, not adapting the HDRES parameters associated with the sub-band under consideration, wherein HDRES parameters that are associated with a sub-band are all those that correspond to frequencies falling within the prescribed frequency range surrounding one of said fundamental frequency bands or their harmonics in which the selected sub-band also falls;
   whenever the speaker signal segment's average power does exceed the speaker signal power threshold, computing the average power for the sub-band under consideration of the near-end microphone signal segment corresponding to the current AEC segment;
   determining if the near-end microphone segment's average power exceeds a prescribed microphone signal power threshold;
   whenever the near-end microphone segment's average power does not exceed the microphone signal power threshold, not adapting the HDRES parameters associated with the sub-band under consideration;
   whenever the near-end microphone segment's average power does exceed the microphone signal power threshold, computing the average power for the sub-band under consideration of the estimated residual echo component of the current AEC segment;
   determining if the estimated residual echo component's average power exceeds a prescribed residual echo power threshold;
   whenever the estimated residual echo component's average power does not exceed the residual echo power threshold, not adapting the HDRES parameters associated with the sub-band under consideration;
   whenever the estimated residual echo component's average power does exceed the residual echo power threshold, determining if the recursive average of the noise component estimated at the sub-band currently under consideration for the current AEC segment was used to estimate the gain for the current AEC segment at that sub-band;
   whenever the recursive average of the noise component estimated at the sub-band currently under consideration for the current AEC segment was used to estimate the gain for the current AEC segment at that sub-band, not adapting the HDRES parameters associated with the sub-band under consideration;
   whenever the recursive average of the noise component estimated at the sub-band currently under consideration for the current AEC segment was not used to estimate the gain for the current AEC segment at that sub-band, determining if the current AEC segment includes a near-end signal component at the sub-band under consideration; and
   whenever the current AEC segment includes a near-end signal component at the sub-band under consideration, not adapting the HDRES parameters associated with the sub-band under consideration.

10. The system of claim 9, further comprising a sub-module for, whenever the current AEC segment includes a near-end signal component at the sub-band under consideration, designating the HDRES parameters associated with the sub-band under consideration that was computed for use with an AEC segment processed a prescribed number of segments prior to the last segment processed which did not include a near-end signal component at the selected sub-band, as the last-computed parameters for use in processing a next AEC segment.

11. The system of claim 9, further comprising sub-modules for:
whenever the current AEC segment does not include a near-end signal component at the sub-band under consideration,
determining if a prescribed number of AEC segments processed immediately prior to the current segment lacked near-end signal components at the sub-band under consideration, and
whenever it is determined said prescribed number of AEC segments processed immediately prior to the current segment did not lack near-end signal components at the sub-band under consideration, not adapting the HDRES parameters associated with the sub-band under consideration.

12. The system of claim 11, further comprising sub-modules for:
whenever it is determined said prescribed number of AEC segments processed immediately prior to the current segment did lack near-end signal components at the sub-band under consideration, determining if the sub-band under consideration falls within a prescribed frequency range surrounding one of the prescribed set of fundamental frequency bands or harmonics thereof, up to the prescribed number of harmonics;
whenever the sub-band under consideration falls within the prescribed frequency range surrounding one of the prescribed set of fundamental frequency bands or harmonics thereof, computing an average power of the delayed transformed speaker signal segment estimated for the current AEC segment at the sub-band under consideration;
computing an error term representing the difference between the actual residual echo component in the AEC output signal and the predicted residual echo component as exhibited in said prescribed signal attribute at the sub-band under consideration;
computing the product of the delayed transformed speaker signal segment estimated for the current AEC segment at the sub-band under consideration, the error term and a prescribed step size factor, and dividing said product by the average power of the delayed transformed speaker signal computed for the current AEC segment at the sub-band under consideration, to generate an adaptation term for the sub-band under consideration; and
adding the adaptation term to the last—computed HDRES parameters associated with the sub-band under consideration to produce adapted HDRES parameters for the sub-band under consideration.

13. The system of claim 12, wherein the sub-module for computing the average power of the delayed transformed speaker signal segment, comprises sub-modules for:
computing the product of the average power of the delayed transformed speaker signal segment computed for the immediately preceding AEC segment at the sub-band under consideration, and one minus a prescribed delayed transformed speaker signal smoothing factor;
computing the product of the square of the delayed transformed speaker signal segment computed for the immediately preceding AEC segment at the selected sub-band, and the prescribed delayed transformed speaker signal smoothing factor; and
summing said products to produce the average power of the current delayed transformed speaker signal segment for the sub-band under consideration.

14. The system of claim 12, wherein the sub-module for computing the error term, comprises a sub-modules for subtracting the instantaneous value of the residual echo component previously estimated for the current AEC segment at the selected sub-band as it would be exhibited in said prescribed signal attribute from the previously-computed instantaneous value of the current AEC segment at that sub-band as it would be exhibited in said prescribed signal attribute.

15. The system of claim 1, wherein the prescribed signal attribute is magnitude.

16. The system of claim 1, further comprising one or more additional HDRES modules each of which inputs the signal output by a preceding HDRES module and the speaker signal, and suppresses at least a portion of a residual part of the speaker signal playback found in the microphone signal, as well as at least a portion of the harmonic distortion caused by the speaker audio signal playback, which was left unsuppressed by the AEC module and all the preceding HDRES modules, to produce the HDRES output signal, and wherein the last signal output by a last HDRES module is designated as the final HDRES output signal.

17. The system of claim 1, further comprising a linear regression residual echo suppression (LRRES) program module which inputs the signal output by the AEC module and the speaker signal, suppresses at least a portion of a residual part of the speaker signal playback found in the microphone signal, and outputs the partially suppressed AEC output signal to the HDRES module which inputs the partially suppressed AEC output signal and the speaker signal, and suppresses at least a portion of a residual part of the speaker audio signal playback found in the microphone signal left unsuppressed by the AEC module and LRRES module, as well as at least a portion of the harmonic distortion exhibited in the AEC output signal caused by the speaker audio signal playback which was left unsuppressed by the AEC module and LRRES module, to produce a HDRES output signal.

18. A system for suppressing a portion of a microphone signal corresponding to a playback of the multiple channels of a speaker audio signal wherein each channel is played aloud via separate loudspeakers in a space having a microphone therein which picks-up said playback and generates a microphone signal, wherein a portion of the microphone signal that corresponds to each channel of the speaker audio signal playback comprises non-linear harmonic distortion caused by the speaker audio signals, said system comprising:
a multi-channel acoustic echo canceller (AEC) module which suppresses a first part of the playback of the multiple channels of the speaker audio signal found in the microphone signal and which generates an AEC output signal;
a first harmonic distortion residual echo suppression (HDRES) module which inputs the AEC output signal and a first one of the channels of the speaker audio signal, and suppresses at least a portion of a residual part of the speaker audio signal playback of the first input channel found in the microphone signal which was left unsuppressed by the AEC module, as well as at least a portion of the harmonic distortion exhibited in the AEC output signal caused by the first input channel of the speaker audio signal playback, to produce a first HDRES output signal; and one or more additional HDRES modules each of which inputs the signal output by the preceding HDRES module and an additional channel of the speaker signal not yet input by a HDRES module, and suppresses at least a portion of a residual part of the speaker audio signal playback of the additional input channel which was left unsuppressed by the AEC module and all preceding HDRES modules, as well as at least a portion of the harmonic distortion exhibited in the AEC output signal caused by the additional channel of the speaker audio signal playback which was left unsuppressed by the AEC module and all preceding HDRES modules, to produce an additional HDRES output signal, and wherein the last HDRES output signal output by the last HDRES module is designated as the final HDRES signal; wherein each HDRES module comprises for each prescribed time-length segment of the AEC output signal in the order it is generated, sub-modules which, for each frequency sub-band in a set of pre-defined sub-bands within a prescribed overall frequency range, estimate an instantaneous value of a residual echo component of the current AEC segment being processed for the sub-band under consideration as exhibited in a prescribed signal attribute, estimate a recursive average of the residual echo component for the current AEC segment at the sub-band currently under consideration, estimate a recursive average of the AEC output signal segments for the current AEC segment at the sub-band currently under consideration, estimate a recursive average of an AEC segment noise component for the current AEC segment at the sub-band currently under consideration, estimate a gain for the current AEC segment at the sub-band currently under consideration using the recursive average estimates, wherein the gain when applied to the current AEC segment suppresses the residual echo component at the sub-band currently under consideration, and compute the product of the gain estimate for the current AEC segment at the sub-band currently under consideration, and the current AEC segment, to generate a HDRES output signal segment component for the sub-band currently under consideration, and which, combine the HDRES output signal segment components generated for each sub-band to produce a HDRES output signal segment which represents the current AEC segment.

19. A system for suppressing a portion of a microphone signal corresponding to a playback of the right and left channels of a speaker stereo audio signal wherein each channel is played aloud via separate loudspeakers in a space having a microphone therein which picks-up said playback and generates the microphone signal, wherein a portion of the microphone signal that corresponds to each channel of the speaker audio signal playback comprises non-linear harmonic distortion caused by the playback, said system comprising:

an stereo acoustic echo canceller (AEC) module which suppresses a first part of the playback of the left and right channels of the speaker signal found in the microphone signal and which generates an AEC output signal;

a first harmonic distortion residual echo suppression (HDRES) module which inputs the AEC output signal and one of the (i) sum of the right and left channels of the speaker signal or (ii) the difference of the right and left channels of the speaker signal, and suppresses at least a portion of a residual part of the speaker signal playback of the input channel sum or difference found in the microphone signal which was left unsuppressed by the AEC module, as well as at least a portion of the harmonic distortion exhibited in the AEC output signal caused by the speaker audio signal playback channels, to produce a first HDRES output signal; and a second HDRES module which inputs the first HDRES output signal and either the sum or difference of the right and left channels of the speaker signal whichever was not input by the first HDRES module, and which suppresses at least a portion of a residual part of the speaker signal playback of the input channel sum or difference found in the microphone signal which was left unsuppressed by the AEC module and the first HDRES module, as well as at least a portion of the harmonic distortion exhibited in the AEC output signal caused by the speaker audio signal playback channels which was left unsuppressed by the AEC module and the first HDRES module, to produce a final HDRES output signal; wherein each HDRES module comprises for each prescribed time-length segment of the AEC output signal in the order it is generated, sub-modules which, for each frequency sub-band in a set of pre-defined sub-bands within a prescribed overall frequency range, estimate an instantaneous value of a residual echo component of the current AEC segment being processed for the sub-band under consideration as exhibited in a prescribed signal attribute, estimate a recursive average of the residual echo component for the current AEC segment at the sub-band currently under consideration, estimate a recursive average of the AEC output signal segments for the current AEC segment at the sub-band currently under consideration, estimate a recursive average of an AEC segment noise component for the current AEC segment at the sub-band currently under consideration, estimate a gain for the current AEC segment at the sub-band currently under consideration using the recursive average estimates, wherein the gain when applied to the current AEC segment suppresses the residual echo component at the sub-band currently under consideration, and compute the product of the gain estimate for the current AEC segment at the sub-band currently under consideration, and the current AEC segment, to generate a HDRES output signal segment component for the sub-band currently under consideration, and which, combine the HDRES output signal segment components generated for each sub-band to produce a HDRES output signal segment which represents the current AEC segment.

\* \* \* \* \*